United States Patent [19]
Gerrish et al.

[11] Patent Number: 5,620,727
[45] Date of Patent: Apr. 15, 1997

[54] METHOD FOR PREPARING A FRIED POTATO FOOD

[75] Inventors: Timothy C. Gerrish; Lawrence E. Carosino, both of Wilmington, Del.

[73] Assignee: Hercules Incorporated, Wilmington, Del.

[21] Appl. No.: 3,769

[22] Filed: Jan. 13, 1993

Related U.S. Application Data

[63] Continuation of Ser. No. 616,474, Nov. 21, 1990, abandoned.

[51] Int. Cl.$^6$ .................................. A23B 7/00; A23L 1/00
[52] U.S. Cl. ........................... 426/302; 426/89; 426/102; 426/303; 426/637
[58] Field of Search ..................... 426/89, 92, 102, 426/272, 273, 573, 271, 302, 303, 304, 438, 506, 509, 574, 575, 576, 577, 578, 637, 804

[56] References Cited

U.S. PATENT DOCUMENTS

| | | | |
|---|---|---|---|
| 2,517,595 | 8/1950 | Owens et al. | 426/102 |
| 2,611,708 | 12/1952 | Owens et al. | 426/102 |
| 3,397,993 | 8/1968 | Strong | 426/464 |
| 3,424,591 | 1/1969 | Gold | 426/102 |
| 4,511,583 | 4/1985 | Olson et al. | 426/89 |
| 4,764,386 | 8/1988 | Bernacchi et al. | 426/89 |
| 4,877,628 | 10/1989 | Stypula | 426/302 |
| 4,897,275 | 1/1990 | Nagai et al. | 426/289 |
| 4,900,573 | 2/1990 | Meyers et al. | 426/302 |
| 4,900,576 | 2/1990 | Bonnett et al. | 426/438 |
| 4,917,908 | 4/1990 | Prosise | 426/102 |
| 4,917,909 | 4/1990 | Prosise | 426/102 |

FOREIGN PATENT DOCUMENTS

| | | |
|---|---|---|
| 0048123 | 8/1991 | European Pat. Off. . |
| 1079628 | 8/1967 | United Kingdom . |

OTHER PUBLICATIONS

Thom, D. et al. "Interchain Associations of Alginate and Pectins" in Gums and Stabilisers for the Food Industry–Interactions of Hydrocolloids, 1982, pp. 97–108, Pergamon Press, Oxford.

Research Disclosure 18237, Jun. 19, 1979, "The Setting of Batter by Poaching Instead of Frying", disclosed by Alginate Industries Ltd., London.

*Primary Examiner*—Leslie A. Wong
*Attorney, Agent, or Firm*—David Edwards

[57] ABSTRACT

A food composition, product and method of making thereof uses tissue, such as vegetable, meat, fish or poultry. The tissue is coated with at least one coating, dried and fried. Initially the coating is a gel including water, hydrocolloid gel forming compounds and a cross-linking agent such as polyvalent cations. The coating at least partially encloses the outer surface of the tissue. The coating is dried prior to frying. The coating (initial, dried and fried) includes at least ten percent equivalent weight of cross-linking agent based on the neutralization equivalent weight of the hydrocolloid. The dried coating is adapted to substantially impede the penetration of oil therethrough. The coated fried products have a low concentration of cooking oil.

11 Claims, 2 Drawing Sheets

METHOD FOR PREPARING A FRIED POTATO FOOD

This application is a continuation, of application Ser. No. 07/616,474, filed Nov. 21, 1990 now abandoned.

The invention relates to a food composition and method for the reduction of oil in fried products. The reduction in oil retention, both absorbed and adsorbed, is accomplished by forming a dry coating including hydrocolloid and polyvalent cations on food prior to frying.

Strong, in U.S. Pat. No. 3,397,993, discloses a process for preparing frozen french fry potato segments. Strong does not coat the potato segments as is provided by the present invention.

In W. L. Gold, U.S. Pat. No. 3,424,591 and M. A. Meyers, U.S. Pat. No. 4,900,573, potato strips are dipped in polymer solutions, drained and fat fried with the polymer layer still wet (hydrated). The coating used in the present invention is dried prior to frying.

In S. Olson, U.S. Pat. No. 4,511,583, potato strips are disclosed as being dipped in polymer solutions, drained, dried and fat fried. Olson does not disclose a potato having a salt bridged gel coating as used in the present invention. Prosise in U.S. Pat. No. 4,917,908 discloses reduced oil french fried potato products and process for preparing by coating potato pieces with polyvinylpyrrolidone. Prosise does not disclose a potato having a salt bridged gel coating as used in the present invention.

A gel is a form of matter intermediate between a solid and a liquid. It consists of polymers, or long-chain molecules, cross-linked to create a tangled network and immersed in a liquid medium. The properties of the gel depend strongly on the interaction of these two components.

The liquid prevents the polymer network from collapsing into a compact mass; the network prevents the liquid from flowing away. Depending on chemical composition and other factors, gels vary in consistency from viscous fluids to fairly rigid solids, but typically they are soft and resilient or jellylike.

The equivalent weight of a substance is the weight thereof that combines, neutralizes or reacts with another substance.

Matrix foods are finely cut and then shaped. They may be cooked and/or contain additives such as flavors, binders and fillers.

There is a need in the food industry for food with less fat, cholesterol and calories. The health consciousness of consumers demands low-fat food having the gustatory attributes (flavor, texture, unguency, etc.) of high-fat food. The invention disclosed herein includes food compositions having reduced fat content while retaining the flavor, texture and color of the afore mentioned fried food products.

BRIEF SUMMARY OF THE INVENTION

A food composition, product and method of making thereof uses tissue, such as vegetable, meat, fish or poultry. The tissue is coated with at least one coating, dried and fried. Initially the coating is a gel including water, hydrocolloid gel forming compounds and a cross-linking agent such as polyvalent cations. The coating at least partially encloses the outer surface of the tissue. The coating is dried prior to frying. The coating (initial, dried and fried) includes, at least ten percent equivalent weight of cross-linking agent based on the neutralization equivalent weight of the hydrocolloid. The dried coating is adapted to substantially impede the penetration of oil therethrough. The coated fried products have a low concentration of cooking oil.

DETAILED DESCRIPTION OF THE INVENTION

In accordance with the invention, tissue such as vegetable, meat, fish or poultry is coated and fried to form low fat food. The tissue is coated with hydrocolloid, dried and fried to produce a low oil product. Frying is carried out in cooking oil. As used here oil refers to oil and/or fat. The coating may be applied as a powder, or as a solution. The solvent of the solution may include water or a more volatile liquid to increase the rate of drying.

The coating includes cross-linking agents, such as polyvalent cations, for example metal ions, and at least one low molecular weight hydrocolloid gel forming compound, which forms a gel by complexing with the polyvalent ions. Examples of hydrocolloid gel forming compounds which may be used in coatings in accordance with the invention as low molecular weight, high molecular weight compounds or mixtures thereof include low methoxyl pectin, amidated low methoxyl pectin, polygalacturonic acid, polygalacturonate salts, pectic acid, pectate salts, alginic acid and carrageenan. Preferred low molecular weight hydrocolloid gel forming compounds useful in accordance with the invention are within the general formulas:

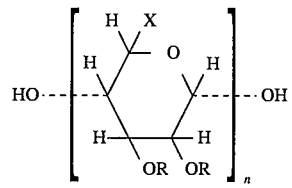

wherein

— is an alpha ($\alpha$) or a beta ($\beta$) glycosidic bond, n is an integer from 10 to 10,000, X is independently selected n times from

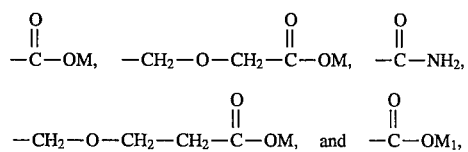

M is H or a cation, $M_1$ is H or methyl,

R is H, $CH_3$, $C_2H_5-$, $-(CH_2-CH_2-O)_y-H$, or

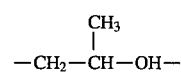

and y is 1 or 2.

In addition to hydrocolloid gel forming compounds, the coating may include a film forming compound such as a high molecular weight hydrocolloid either mixed with the hydrocolloid gel forming compound or as a separate outer layer applied to the coating.

Figure 1:
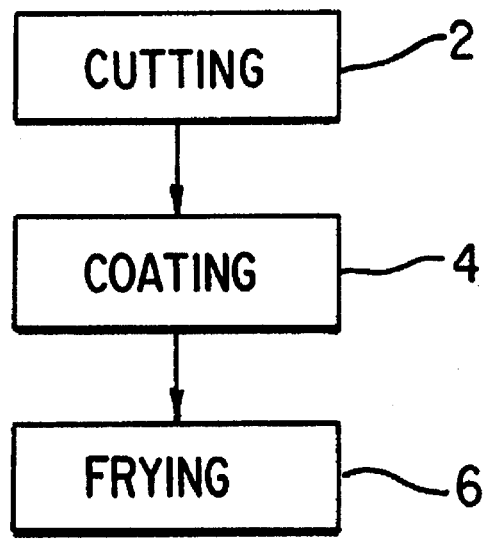
FIG. 1 is a schematic diagram of the general process steps used in the invention.
Figure 2:
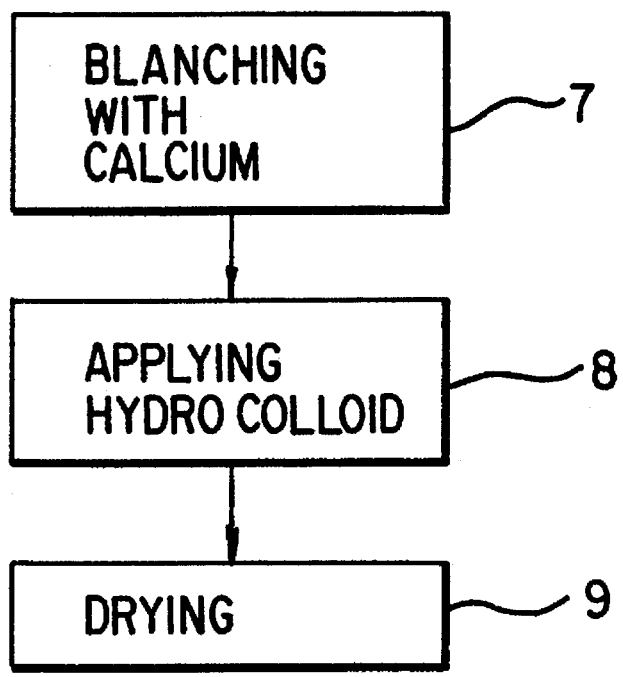
FIG. 2 is a schematic diagram of coating process steps used in accordance with the invention.

The general process steps used in the invention are shown in FIG. 1. Tissue is processed by cutting 2 into desired shapes. By coating 4 the cut tissue is prepared for frying 6. In a preferred embodiment of the invention, coating includes blanching 7 with an aqueous solution containing calcium ions, applying hydrocolloid 8, and drying 9 as shown in FIG. 2.

Figure 3:
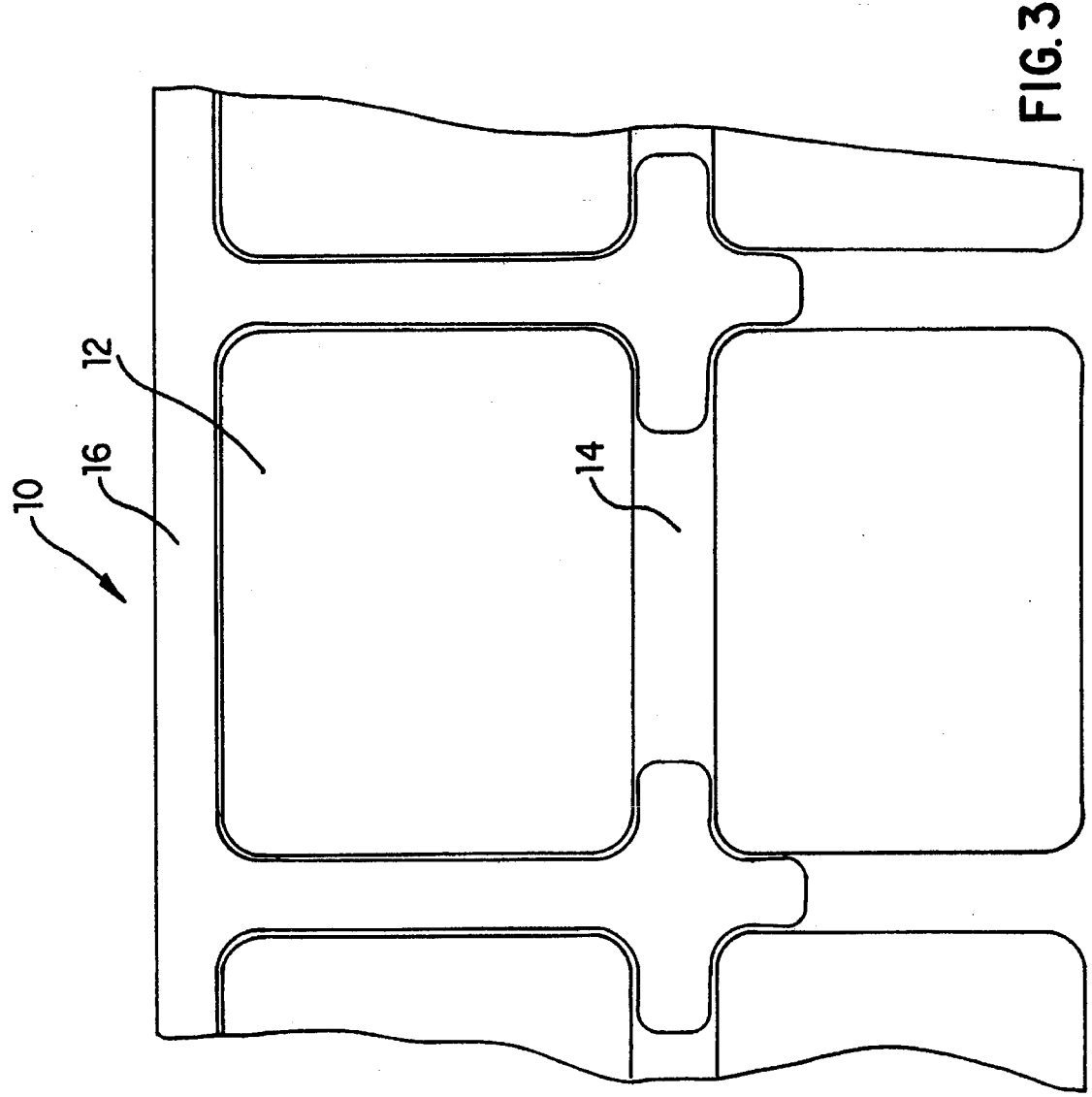
FIG. 3 is a schematic cross-section side view of a coated tissue composition in accordance with the invention.

Coated tissue 10 includes cells 12 adhered together by interstitial material 14. Coating 16 includes multivalent cations and low and high molecular weight hydrocolloids which cover cells 12 as shown in FIG. 3. During frying in cooking oil, water moves out of cells 12, but oil substantially prevented from entering cells 12 by coating 16.

The extent of penetration of the coating into the interstitial materials 14 is directly related to the blanch time, pressure and temperature. Vacuum (pressures below atmospheric) and pressures above atmospheric may be used to increase penetration of the coating. Blanching at higher temperatures and/or under a pressure gradient for longer times (but commensurate with tissue integrity) increases the extent of penetration by the coating between the cells 12.

Hydrocolloids for the coatings may be applied as a dry powder or solution of hydrocolloid. In dry powder form, the hydrocolloid hydrates with moisture on the surface of the tissue to form the gel. The solution includes water. The solution may include alcohol. During drying a continuous coating is formed, and the coated tissue is ready to be fried, par fried and frozen or frozen for later frying.

In a preferred embodiment of the invention, potato strips treated with a solution containing calcium ions to form a film are coated by soaking in a solution of low molecular weight ionic hydrocolloids. These potato strips are then coated by dipping or spraying with a solution of medium to high molecular weight synthetic or chemically modified natural hydrocolloid or other film forming material. In a preferred embodiment of the invention coatings are dried prior to deep fat frying. The invention provides for the production of french fried potatoes having up to 70% reduction in retained oil as compared to untreated potatoes.

Partial drying may be used before coating and after coating with hydrocolloid materials. Drying rates are increased by use of volatile solvents in the hydrocolloid solution. Drying of the outer tissue layer may be carried out before coating. This reduces the amount of water to be removed after a coating solution is applied. Other treatments which may be used before coating to make compositions in accordance with the present invention include: sugar dips, salt dips, pH adjustments, dehydration, heating, cooling, and agitation.

The blanch with cations is carried out using an aqueous solution having at least about 0.2 percent by weight of the cation, such as calcium. Preferably the aqueous blanch solution has from about 0.3 to 0.8 percent by weight of the cation.

Low molecular weight ionic hydrocolloid compositions provide improved processability by reducing the tendency of coated food pieces such as french fries to stick together. Use of low molecular weight ionic hydrocolloid compositions also improve processability due to increased drying rates and improve the organoleptic properties of the product such as its texture, mouth feel, bite, color and reduced shine or gloss.

Coated compositions in accordance with a preferred embodiment of the invention are formed by cutting, blanching, coating and drying. The blanch water typically includes calcium ions. Multiple coatings may be used. These coated compositions are then fried to form coated products. The frying may be short in duration (par frying) such as from about 1 to about 60 seconds, or of long duration (to fully cook the tissue), such as from about 60 seconds to about one hour. Frying of coated compositions in accordance with the invention may be carried out from about 3 seconds to about one hour at a temperature from about 100° to 200° C.

Frying is preferably carried out under substantially isothermal conditions at temperatures between 100° and 180° C. for from 5 seconds to about 30 minutes. More preferably, the frying is carried out at temperatures between 100° and 170° C. for from about 10 seconds to about 15 minutes.

The dry coatings of the composition in accordance with the invention may be from 0.0254 mm to 1.3 mm. Preferably, these coatings are from 0.0254 mm to 0.254 mm.

Low molecular weight hydrocolloids used in coatings in accordance with the invention have preferably have a molecular weight of greater than about 200; for example from about 200 to 80,000, and more preferably from about 2000 to 50,000 but most preferably from 2000 to 30,000. Within the most preferred range low molecular weight hydrocolloids used in coatings in accordance with the invention have a molecular weight of less than about 20,000 and more preferably less than 15,000.

High molecular weight hydrocolloids used in coatings in accordance with the invention preferably have a molecular weight of more than 80,000, for example from 80,000 to about 10,000,000 and more preferably from 80,000 to 1,000,000 and most preferably from 80,000 to 200,000.

Preferably, the dried coating of the coated raw tissue composition of the invention includes less than 20 percent by weight water. More preferably, the dried coating of the coated raw tissue composition of the invention includes less than 15 percent by weight water. Most preferably the dried coating of the coated raw tissue composition of the invention includes less than 10 percent by weight water.

Preferably, the outer cell tissue layer of raw cut tissue is at least partially dried prior to coating to form a dried outer tissue layer. Preferably the concentration of water in the outer layer of dried cut tissue is from 0.1 to 80 percent of the concentration of water in raw tissue. More preferably, the concentration of water in the outer layer of dried cut tissue is from 0.1 to 50 percent of the concentration of water in raw tissue. Most preferably, the concentration of water in the outer layer of dried cut tissue is from 0.1 to 30 percent of the concentration of water in raw tissue.

Preferably, the par fried coated product in accordance with an embodiment of the invention is frozen by reducing the temperature thereof to less than 0° C. to form a dried frozen food. Preferably, the frozen food, is heated to at least 100° C. for at least 5 seconds to form a cooked product.

Prior to drying the amount of polyvalent metal ions is at least 0.05 percent by weight in the gel coating on the raw tissue. The amount of polyvalent metal ions is at least 1.0 percent by weight in the coating of the par fried and fully fried tissue. Preferably, the concentration of polyvalent metal ions in the gel coating is more than 0.1 percent by weight. More preferably, the concentration of polyvalent metal ions in the gel coating is more than 0.2 percent by weight.

The polyvalent metal ions are present in the dry or the raw as well as the fried tissue coating in an amount of at least ten percent equivalent weight based on the neutralization equivalent weight of the hydrocolloid compounds. Thus, at least ten percent of the amount of polyvalent metal ions is required to neutralize the hydrocolloid compounds.

Preferably, the metal ions are present in the dry coating on the raw as well as the fried tissue in an amount of at least thirty percent equivalent weight based on the neutralization equivalent weight of the hydrocolloid compounds in the coating. Most preferably, the metal ions are present in the dry coating on the raw as well as the fried tissue in an amount of at least fifty percent equivalent weight of the neutralization equivalent weight based on the hydrocolloid compounds in the coating.

The cooked product preferably includes at least 40 percent by weight less cooking oil than said cooked control tissue. The cell tissue of the composition of the invention may include fruit, such as apples, bananas and plantain, vegetables such as potato, onion, carrots, zucchini, poultry, fish, meat or processed foods such as matrix potatoes and matrix meats.

Low molecular weight hydrocolloids may be readily prepared by either acid, alkaline or enzymatic degradation and hydrolysis of suitable precursors. In a preferred embodiment of this invention the low molecular weight hydrocolloid is derived from pectins which are a group of complex, high molecular weight polysaccharides found in plants and composed chiefly of partially methylated polygalacturonic acid units. Portions of the carboxyl group occur as methyl esters, and the remaining carboxyl groups exist in the form of the free acid or as its ammonium, potassium, or sodium salts, and in some types as the acid amide.

Pectin is produced commercially by extracting citrus peel, apple pomace, or sugar beet pulp with a hot dilute acid (pH 1.0 to 3.5, 70° to 900°). The extract is filtered, and pectin is then precipitated from the clear extract with ethanol or isopropanol, or as the copper or aluminum salt. The acid extract is sometimes spray- or roller-dried or it is concentrated.

Hydrocolloid gel forming compounds of the above general formula are used above in accordance with the invention as coatings to reduce the fat absorbed/adsorbed by cellular tissue fried in deep fat. Optional-treatments before coating include: sugar dips, salt dips, pH adjustments, dehydration, heating, cooling, and agitation.

Coatings are applied for example to potato cell surfaces to form compositions in accordance with the invention by dipping, spraying, extrusion, sequential multiple or dry coating such as by dusting with powdered coating compounds. Coatings may be applied at atmospheric, high or low pressure. Coating compositions may be dried on all tissue using forced air (hot or cold), by using flash or vacuum drying to form coated compositions in accordance with the invention.

Additives which may be included in the coating compositions of the invention include: salts (mono- and polyvalent), sugars, plasticizers (propylene glycol, glycerol, sorbitol, propylene glycol monostearate, glycerol monostearate, polyethylene glycol), inert materials (celite, cellulose, silicas); solvents such as water, ethanol, isopropanol, ethyl acetate, binary mixtures, ternary mixtures.

One other advantage of this treatment method is that the oil resistant coating allows easy removal of the adsorbed oil present on the strips after removal from the hot frying oil. Conventional shaking, hot air and/or steam stripping of this adsorbed oil results in further oil reductions.

For use in the examples below low molecular weight pectin hydrocolloid is formed from pectin by providing a 10% high methoxyl pectin precursor slurry in 60:40 isopropanol (IPA) water. Sodium hydroxide is added to the slurry at a level of 3 equivalents/equivalent anhydrogalacturonide. After 5 days at 25° C. or 2 days at 40° C., sufficient depolymerization and deesterification has occurred. The product is filtered and the filter cake resulting is washed with IPA water (60:40) to remove excess adhering alkali. The pH of the pectin cake is then adjusted with mineral acid to between 4 and 6 and is then dried. The degree of esterification of this product is less than 10%. The molecular weight, measured by the viscosity procedure of Smit and Bryant [J. Food Science, 32, 197 (1967)], ranges from 2000–20,000.

The fried products from the Control and Examples 1–32 are analyzed for oil content by extracting the fried potato strips with hexane using a Soxhlet extraction apparatus. The potato strips are diced into 3.18 mm (0.125 inch) segments, loaded into an extraction thimble and extracted with rapidly refluxing hexane for 2 hours. The oil-hexane mixture is then evaporated to a small volume using a rotary evaporator. The remaining small volume is transferred quantitatively to preweighed evaporation dishes to allow the remaining hexane to evaporate leading to a constant weight.

Control I below follows the blanching, drying and frying of U.S. Pat. No. 3,397,993 (McDonald's), column 2, lines 15–55. Control I is compared to Examples 1–28. Example 29 freezes a par fried coated potato, Example 30 fully fries frozen par fried potato and Examples 31 and 32 apply polyvalent cross-linking ions and hydrocolloid gel forming compound in a single coating step.

CONTROL I

Prefried

Fresh Idaho russet potatoes referred to by size as Idaho 100's (100 potatoes per 50 pound box) are sliced with a manual potato slicing device which produces consistent 7.95 mm by 7.95 mm (0.313 by 0.313 inch) strips. Twenty-five grams of strips are then washed in a large volume of cold water to remove surface starch and sugars. The washed strips are trimmed to 2.5 to 3.0 inches in length to form prefried strips. The strips are blanched by heating at 85° C. for 8 minutes in water. The strips are then dried in a mechanical convection oven at 150° C. for 10 minutes.

Fried

Strips are then fried in two (2) gallons of oil at 170° C. for three (3) minutes. At the completion of frying, the frying basket is removed from the oil and shaken by hand 5 seconds over the hot oil. The strips are then removed to paper towels to drain until cool. The product has 9.1 g of oil per 100 g product.

EXAMPLE 1

Prefried

The potato strips are treated as in Control I but with the use of 0.5% aqueous solution of calcium chloride as blanch water. The strips are then are soaked in a 5% aqueous solution of low molecular weight pectin for 5 minutes at 37° C. The strips are then dried in a convection oven at 150° C. for 10 minutes.

Fried

Strips are then fried in two (2) gallons of oil at 170° C. for three (3) minutes. At the completion of frying, the frying basket is removed from the oil and shaken by hand 5 seconds over the hot oil. The strips are then removed to paper towels to drain until cool. These product strips have an oil content of 6.1 g oil per 100 g of product.

EXAMPLE 2

Prefried

The potato strips treated as in Example 1 (Prefried Section) and then dipped for 8 seconds in a 1.0% aqueous solution of methylcellulose. The strips are allowed to drain for 2 minutes. The strips are then dried in a convection oven at 150° C. for 10 minutes.

Fried

Strips treated are fried in two (2) gallons of oil at 170° C. for three (3) minutes. At the completion of frying, the frying basket is removed from the oil and shaken by hand 5 seconds over the hot oil. The strips are then removed to paper towels to drain until cool. These product strips have an oil content of 4.3 g oil per 100 g of product.

EXAMPLE 3

Prefried

The potato strips treated as Example 1 (Prefried Section). The strips are then dipped for 8 seconds in a 1.0% aqueous solution of methylcellulose. The strips are allowed to drain for 2 minutes. The strips are then dried in a convection oven at 150° C. for 6 minutes. A second coating is applied by dipping the strips for 8 second in a 1.0% aqueous solution of methylcellulose, and then drying for an additional 10 minutes.

Fried

Strips are then fried in two (2) gallons of oil at 170° C. for three (3) minutes. At the completion of frying, the frying basket is removed from the oil and shaken by hand 5 seconds over the hot oil. The strips are then removed to paper towels to drain until cool. These product strips have an oil content of 3.8 g oil per 100 g of product.

EXAMPLE 4

Prefried

Fresh Idaho russet potatoes referred to by size as Idaho 100's (100 potatoes per 50 pound box) are sliced with a manual potato slicing device which produces consistent 0.313×0.313 inch strips. Twenty-five grams of strips are then washed in a large volume of cold water to remove surface starch and sugars. The washed strips are trimmed to 2.5 to 3.0 inches in length to form prefried strips. The strips are blanched by heating at 85° C. for 8 minutes in a 0.5% aqueous solution of calcium chloride. The prefried potato strips are soaked in a 5% aqueous solution of pectin prepared as described above for 5 minutes at 37° C. The coated strips are next dried with air at sufficient velocity and temperature to convert the aqueous pectin solution to a dried film. The strips are then dipped for 8 seconds in a 1.0% aqueous solution of methylcellulose. The strips are allowed to drain for 2 minutes. The strips are then dried in a convection oven at 150° C. for 10 minutes.

Fried

Strips treated are fried in two (2) gallons of oil at 170° C. for three (3) minutes. At the completion of frying, the frying basket is removed from the oil and shaken by hand 5 seconds over the hot oil. The strips are then removed to paper towels to drain until cool. The product strips have an oil content of about 4 g of oil per 100 g of product.

EXAMPLE 5

The procedure of Example 4 (Prefried Section) is followed except that a 3% aqueous solution of high molecular weight (100,000), high methoxyl (50–75%, Degree of esterification) pectin is substituted for methylcellulose. Strips treated are fried in two (2) gallons of oil at 170° C. for three (3) minutes. At the completion of frying, the frying basket is removed from the oil and shaken by hand 5 seconds over the hot oil. The strips are then removed to paper towels to drain until cool. The product strips have an oil content of about 4 g of oil per 100 g of product.

EXAMPLE 6

The procedure of Example 4 (Prefried Section) is followed except that a 3% aqueous solution of low molecular weight (20,000), high methoxyl (50–75%, Degree of esterification) pectin is substituted for methylcellulose. Strips treated are fried in two (2) gallons of oil at 170° C. for three (3) minutes. At the completion of frying, the frying basket is removed from the oil and shaken by hand 5 seconds over the hot oil. The strips are then removed to paper towels to drain until cool. The product strips have an oil content of about 4 g of oil per 100 g of product.

EXAMPLE 7

The procedure of Example 4 (Prefried Section) is followed except that a 3% aqueous solution of high molecular weight (100,000), low methoxyl (15–50%, Degree of esterification) pectin is substituted for methylcellulose. Strips treated are fried in two (2) gallons of oil at 170° C. for three (3) minutes. At the completion of frying, the frying basket is removed from the oil and shaken by hand 5 seconds over the hot oil. The strips are then removed to paper towels to drain until cool. The product strips have an oil content of about 4 g of oil per 100 g of product.

EXAMPLE 8

The procedure of Example 4 (Prefried Section) is followed except that a 3% aqueous solution of low molecular weight (20,000), low methoxyl (15–50%, Degree of esterification) pectin is substituted for methylcellulose. Strips treated are fried in two (2) gallons of oil at 170° C. for three (3) minutes. At the completion of frying, the frying basket is removed from the oil and shaken by hand 5 seconds over the hot oil. The strips are then removed to paper towels to drain until cool. The product strips have an oil content of about 4 g of oil per 100 g of product.

EXAMPLE 9

The procedure of Example 4 (Prefried Section) followed except that a 3% aqueous solution of amidated pectin (Degree of amidation, 15–40%; Degree of esterification 20–40%) is substituted for methylcellulose. Strips treated are fried in two (2) gallons of oil at 170° C. for three (3) minutes. At the completion of frying, the frying basket is removed from the oil and shaken by hand 5 seconds over the hot oil. The strips are then removed to paper towels to drain until cool. The product strips have an oil content of about 4 g of oil per 100 g of product.

EXAMPLE 10

Prefried

The potato strips treated as in Example 1 (Prefried Section) except that drying is provided by partially. dehydrating using air at sufficient velocity and temperature to result in about 10% by weight moisture loss. The partially dehydrated strips are soaked in a 5% aqueous solution of low molecular weight pectin for 5 minutes at 37° C. The coated strips are next dried with air at sufficient velocity and temperature to convert the aqueous low molecular weight solution to a dried film. The strips are then dipped for 8 seconds in a 1% aqueous solution of methylcellulose. The strips are allowed to drain for 2 minutes. The strips are then dried in a convection oven at 150° C. for sufficient time to result in about 25% moisture weight loss.

Fried

Strips treated are fried in two (2) gallons of oil at 170° C. for three (3) minutes. At the completion of frying, the frying basket is removed from the oil and shaken by hand 5 seconds over the hot oil. The strips are then removed to paper towels to drain until cool. The product strips have an oil content of about 3.5 g oil per 100 g of product.

EXAMPLE 11

The procedure of Example 10 (Prefried Section) is followed except that alginate having a molecular weight of about 100,000 is substituted for methylcellulose. Strips treated are fried in two (2) gallons of oil at 170° C. for three (3) minutes. At the completion of frying, the frying basket is removed from the oil and shaken by hand 5 seconds over the hot oil. The strips are then removed to paper towels to drain until cool. The product strips have an oil content of about 3.5 g oil per 100 g of product.

EXAMPLE 12

The procedure of Example 10 (Prefried Section) is followed except that alginate having a molecular weight of about 5,000 is substituted for low molecular weight pectin. Strips treated are fried in two (2) gallons of oil at 170° C. for three (3) minutes. At the completion of frying, the frying basket is removed from the oil and shaken by hand 5 seconds over the hot oil. The strips are then removed to paper towels to drain until cool. The product strips have an oil content of about 3.5 g oil per 100 g Of product.

EXAMPLE 13

Prefried

The potato strips treated as in Control I but with the use of 0.5% aqueous solution of calcium chloride for the blanch water. The strips are then soaked in an aqueous solution mixture of low molecular weight pectin as described above (5%) and methylcellulose (1%) for 5 minutes at 37° C. The strips are then dried in a convection oven at 150° C. for 10 minutes.

Fried

Strips treated are fried in two (2) gallons of oil at 170° C. for three (3) minutes. At the completion of frying, the frying basket is removed from the oil and shaken by hand 5 seconds over the hot oil. The strips are then removed to paper towels to drain until cool. The product strips have an oil content of about 4 g of oil per 100 g of product.

EXAMPLE 14

The procedure of Example 13 (Prefried Section) is followed except that carrageenan having a molecular weight of about 100,000 is substituted for methylcellulose. Strips treated are fried in two (2) gallons of oil at 170° C. for three (3) minutes. At the completion of frying, the frying basket is removed from the oil and shaken by hand 5 seconds over the hot oil. The strips are then removed to paper towels to drain until cool. The product strips have an oil content of about 4 g of oil per 100 g of product.

EXAMPLE 15

The procedure of Example 13 (Prefried Section) is followed except that the strips are fried for one (1) minute (rather than three (3) minutes) at 170° C. At the completion of frying, the frying basket is removed from the oil and shaken by hand 5 seconds over the hot oil. The strips are then removed to paper towels to drain until cool. The product strips have an oil content of about 2.5 g oil per 100 g of product.

EXAMPLE 16

The procedure of Example 13 (Prefried Section) is followed except that carrageenan having a molecular weight of about 5,000 is substituted for low molecular weight pectin. Strips treated are fried in two (2) gallons of oil at 170° C. for three (3) minutes. At the completion of frying, the frying basket is removed from the oil and shaken by hand 5 seconds over the hot oil. The strips are then removed to paper towels to drain until cool. The product strips have an oil content of about 4 g of oil per 100 g of product.

EXAMPLE 17

Prefried

The potato strips are treated as in Control I (prefried section) but with the use of 0.5% aqueous solution of calcium chloride for the blanch water. The strips are then soaked in an aqueous solution mixture of low molecular weight pectin as described above for 5 minutes at 37° C. The coated strips are next dried with air at sufficient velocity and temperature to convert the aqueous low molecular weight solution to a dried film. The strips are then recoated with the low molecular weight pectin by soaking in a 5% aqueous solution for 5 minutes at 37° C. The strips are then dried in a convection oven at 150° C. for sufficient time to result in a 10–35% moisture weight loss.

Fried

Strips are then fried in two (2) gallons of oil at 170° C. for three (3) minutes. At the completion of frying, the frying basket is removed from the oil and shaken by hand 5 seconds over the hot oil. The strips are then removed to paper towels to drain until cool. The product strips have an oil content of about 4 g of oil per 100 g of product.

EXAMPLE 18

The procedure of Example 17 (Prefried Section) is followed except that arabic acid having a molecular weight of about 10,000 is substituted for low molecular weight pectin. Strips treated are fried in two (2) gallons of oil at 170° C. for three (3) minutes. At the completion of frying, the frying basket is removed from the oil and shaken by hand 5 seconds over the hot oil. The strips are then removed to paper towels to drain until cool. The product strips have an oil content of about 4 g of oil per 100 g of product.

EXAMPLE 19

The procedure of Example 17 (Prefried Section) is followed except that arabic acid having a molecular weight of about 100,000 is substituted for low molecular weight pectin. Strips treated are fried in two (2) gallons of oil at 170° C. for three (3) minutes. At the completion of frying, the frying basket is removed from the oil and shaken by hand 5 seconds over the hot oil. The strips are then removed to paper towels to drain until cool. The product strips have an oil content of about 4 g of oil per 100 g of product.

EXAMPLE 20

The procedure of Example 17 (Prefried Section) is followed except that arabic acid having a molecular weight of about 10,000 is substituted for low molecular weight pectin. Strips treated are fried in two (2) gallons of oil at 170° C. for two (2) minutes. At the completion of frying, the frying basket is removed from the oil and shaken by hand 5 seconds over the hot oil. The product strips have an oil content of about 3.5 g of oil per 100 g of product.

EXAMPLE 21

The procedure of Example 20 (Prefried Section) is followed except that carboxymethylcellulose having a molecular weight of about 10,000 is substituted for low molecular weight pectin. Strips treated are fried in two (2) gallons of oil at 170° C. for three (3) minutes. At the completion of frying, the frying basket is removed from the oil and shaken by hand 5 seconds over the hot oil. The product strips have an oil content of about 3.5 g of oil per 100 g of product.

EXAMPLE 22

The product of Example 20 (Prefried Section) is followed except that carboxymethylcellulose having a molecular weight of about 100,000 is substituted for low molecular weight pectin. Strips treated are fried in two (2) gallons of oil at 170° C. for three (3) minutes. At the completion of frying, the frying basket is removed from the oil and shaken by hand 5 seconds over the hot oil. The product strips have an oil content of about 3.5 g of oil per 100 g of product.

EXAMPLE 23

The procedure of Example 4 (Prefried Section) is followed except that the low molecular weight pectin is prepared in solvent of 3 parts of ethanol and 7 parts of water rather than water alone. Strips treated are fried in two (2) gallons of oil at 170° C. for three (3) minutes. At the completion of frying, the frying basket is removed from the oil and shaken by hand 5 seconds over the hot oil. The product strips have an oil content of about 4 g per 100 g of product.

EXAMPLE 24

The procedure of Example 23 (Prefried Section) is followed except that the drying time is reduced to seven (7) minutes from ten (10) minutes. Strips treated are fried in two (2) gallons of oil at 170° C. for three (3) minutes. At the completion of frying, the frying basket is removed from the oil and shaken by hand 5 seconds over the hot oil. The product strips have an oil content of about 4 g per 100 g of product.

EXAMPLE 25

The procedure of Example 4 (Prefried Section) is followed except that methylcellulose of low molecular weight is prepared in a solvent composed of 3 parts ethanol and 7 parts of water. Strips treated are fried in two (2) gallons of oil at 170° C. for three (3) minutes. At the completion of frying, the frying basket is removed from the oil and shaken by hand 5 seconds over the hot oil. The product strips have an oil content of about 3.5 g of oil per 100 g of product.

EXAMPLE 26

The procedure of Example 25 (Prefried Section) is followed except that drying is done for seven (7) minutes (rather than ten (10) minutes). Strips treated are fried in two (2) gallons of oil at 170° C. for three (3) minutes. At the completion of frying, the frying basket is removed from the oil and shaken by hand 5 seconds over the hot oil. The product strips have about 4 g of oil per 100 g of product.

EXAMPLE 27

The procedure of Example 4 (Prefried Section) is followed except ethanol is substituted for water in the 5% solution. Strips treated are fried in two (2) gallons of oil at 170° C. for three (3) minutes. At the completion of frying, the frying basket is removed from the oil and shaken by hand 5 seconds over the hot oil. The product strips have about 4 g of oil per 100 g of product.

EXAMPLE 28

The procedure of Example 27 (Prefried Section) is followed except that drying is carried out for seven (7) minutes rather than ten (10) minutes. Strips treated are fried in two (2) gallons of oil at 170° C. for three (3) minutes. At the completion of frying, the frying basket is removed from the oil and shaken by hand 5 seconds over the hot oil. The product strips have about 4 g of oil per 100 g of product.

As shown in Table 1, significant reductions in oil retention are obtained using dried coatings of low and high molecular weight hydrocolloids. These hydrocolloids are representative of those in the general formula.

Example 29 and 30 below are illustrative of the use of par frying and freezing in forming the compositions of the invention.

EXAMPLE 29

The potato strips treated as in control I (prefried section) but with the use of 0.5% aqueous solution of calcium chloride as blanch water. The strips are then are soaked in a 5% aqueous solution of low molecular weight pectin for 5 minutes at 37° C. The strips are then dried in a convection oven at 150° C. for 10 minutes. The strips are then par fried in 2 gallons of oil at 170° C. for 45 seconds. The strips are then frozen. These product strips have an oil content of about 2 g oil per 100 g of product.

EXAMPLE 30

The potato strips treated as in Example 29 are fried in two (2) gallons of oil at 170° C. for three (3) minutes. At the completion of frying, the frying basket is removed from the oil and shaken by hand 2.5 seconds over the hot oil. The strips are then removed to paper towels to drain until cool. These product strips have an oil content of about 5 g oil per 100 g of product.

EXAMPLE 31

The potato strips treated as in Control I (prefried) except for blanching, are soaked in a 5% aqueous solution of low molecular weight pectin and 0.3% calcium for 6 minutes at 85° C. Strips treated are fried in two (2) gallons of oil at 170° C. for three (3) minutes. At the completion of frying, the frying basket is removed from the oil and shaken by hand 5 seconds over the hot oil. The strips are then removed to paper towels to drain until cool. These product strips have an oil content of about 5 g oil per 100 g of product.

EXAMPLE 32

The potato strips are treated as in Control I (prefried section) but with the use of 0.5% aqueous solution of calcium chloride as blanch water. The strips then are soaked in a 5% aqueous solution of low molecular weight pectin for 5 minutes at 37° C. The strips are then soaked in a 5% aqueous solution of high molecular weight methylcellulose for 2 minutes at 37° C. The strips are then dried in a convection oven at 150° C. for 10 minutes. The strips are then par fried in 2 gallons of oil at 170° C. for 45 seconds. The strips are then shaken and steam stripped for 1 minute. The strips are then frozen. These product strips have an oil content of about 1.5 g oil per 100 g of product.

TABLE 1

| OIL REDUCTIONS | |
|---|---|
| EXAMPLE NO. | % REDUCTION |
| I (Control) | — |
| 1 | 33 |
| 2 | 53 |
| 3 | 58 |
| 4 | 56 |
| 5 | 56 |
| 6 | 56 |
| 7 | 56 |
| 8 | 56 |
| 9 | 56 |
| 10 | 62 |
| 11 | 62 |
| 12 | 62 |
| 13 | 56 |
| 14 | 56 |
| 15 | 73 |
| 16 | 56 |
| 17 | 56 |
| 18 | 56 |
| 19 | 56 |
| 20 | 62 |
| 21 | 62 |
| 22 | 62 |
| 23 | 56 |
| 24 | 56 |
| 25 | 62 |
| 26 | 56 |
| 27 | 56 |

TABLE 1-continued

| OIL REDUCTIONS | |
|---|---|
| EXAMPLE NO. | % REDUCTION |
| 28 | 56 |
| 29 | 78 |
| 30 | 45 |
| 31 | 45 |
| 32 | 84 |

Other features, advantages and specific embodiments of this invention will become readily apparent to those exercising ordinary skill in the art after reading the foregoing disclosures. In this regard, while specific embodiments of this invention have been described in considerable detail, variations and modifications of these embodiments can be effected without departing from the spirit and scope of the invention as disclosed and claimed.

What is claimed is:

1. A method for preparing fried potato food with reduced oil or fat absorption comprising
   a. blanching the food,
   b. treating the food with an aqueous solution having at least about 0.2% by weight of calcium ions,
   c. at least partially coating the food with at least one calcium crosslinkable hydrocolloid gel forming compound having a molecular weight in the range of 2,000 to 30,000, and selected from the group consisting of pectin, amidated pectin, polygalacturonates, polygalacturonic acid, pectinic acid, pectinates, and mixtures thereof,
   d. drying the coated food, and
   e. frying the dried, coated food in cooking oil or fat in a temperature range of 100 to 200 degrees C. to form an at least partially coated, fried potato food product having reduced oil or fat content,
   wherein steps b and c are performed separately.

2. The method of claim 1 wherein the food is blanched with said aqueous solution.

3. The method of claim 1 wherein said frying step comprises par frying the food and wherein said par fried food is then frozen.

4. The method of claim 1 wherein prior to drying, the amount of calcium ions is at least 0.05% by weight in the gel coating on the food.

5. The method of claim 1 wherein said food product has texture, color, gloss, and flavor similar to that of uncoated oil fried potatoes.

6. The method of claim 1 wherein the food is treated with multiple coatings.

7. The method of claim 1 wherein the food is also treated with additives.

8. The method of claim 1 wherein the additives are included in the gel forming compound.

9. The method of claim 1 wherein the coating is selected from pectates and the food comprises potatoes cut in the form of a matrix, french fries or chips.

10. The method of claim 9 wherein the food is french fries.

11. The method of claim 1 wherein said fried potato food has oil on its outer surface and said oil is substantially removed from said food.

* * * * *